United States Patent
Khan

(10) Patent No.: US 6,411,708 B1
(45) Date of Patent: Jun. 25, 2002

(54) SYSTEM AND METHOD FOR PURGING A CALL LIST

(75) Inventor: Saima Khan, Chelmsford, MA (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/089,304

(22) Filed: Jun. 2, 1998

(51) Int. Cl.$^7$ .............................. H04M 3/00; H04M 5/00
(52) U.S. Cl. ............................... 379/266.07; 379/266.1
(58) Field of Search ...................... 379/38, 92.01–92.03, 379/106.01, 106.02, 201, 211, 212, 265, 266, 355, 356, 201.01, 201.02, 201.05, 211.01, 212.01, 265.01, 265.02, 266.01, 266.07, 266.08, 355.01, 355.05, 355.06, 266.1

(56) References Cited

U.S. PATENT DOCUMENTS

| | | | | |
|---|---|---|---|---|
| 5,343,518 A | * | 8/1994 | Kneipp | 379/355 |
| 5,592,543 A | * | 1/1997 | Smith et al. | 379/265 |
| 5,796,791 A | * | 8/1998 | Polcyn | 379/265 |
| 5,832,068 A | * | 11/1998 | Smith | 379/114.14 |
| 5,943,410 A | * | 8/1999 | Shaffer et al. | 379/213 |
| 6,141,412 A | * | 10/2000 | Smith et al. | 379/265 |

* cited by examiner

Primary Examiner—Fan Tsang
Assistant Examiner—Roland G. Foster
(74) Attorney, Agent, or Firm—Bourque & Associates, P.A.

(57) ABSTRACT

In accordance with the present invention, a call list update processing system is provided. The system is incorporated into a predictive dialing system, which includes a call list controller, responsive to a source of call records for establishing and storing at least one call list. Each call record includes at least one telephone number to be called. The system includes a predictive dialer, which is responsive to the call list controller for dialing the telephone numbers included in the call records in the call list. The system is used to update a call list on a periodic basis and includes, at least a call list update processor, which itself includes at least a call list update file and a comparator. The call list update file is where call record update data, which is received periodically from the source of call records, is stored. The comparator compares the call record update data stored in the call list update file with call record data stored in the stored call records. The call list update processor then updates the call list to reflect the call record update data. The call list update processor may also include a host update file where call record update data received by a call center agent during a predictive dialer-initiated telephone call is stored. The call record update data stored in the host update file can be transmitted by the call list update processing system whenever communications are established with the host processor.

5 Claims, 2 Drawing Sheets

SYSTEM AND METHOD FOR PURGING A CALL LIST

FIELD OF THE INVENTION

This invention relates to automated telephone call processing systems and more particularly, to a system and method of updating a call list that is being utilized in an outgoing telephone call campaign.

BACKGROUND OF THE INVENTION

Since the 1980's, telephone call centers have employed automated systems to increase call center efficiency. For example, automatic call distribution (ACD) systems were developed to handle inbound calls more efficiently and to replace banks of multi-button telephony sets and randomly-handled calls. As call volumes increased, voice response units (VRU) were developed to enable customers using touch-tone telephones to directly interact a call center's host computer. In addition, predictive dialers were developed to automate outbound calling functions. Predictive dialers increased productivity by more than three hundred percent over manual dialing operations by automatically screening out all "no answers", busy signals, and answering machines, and only presented call center agents with live voices.

Despite the rapid advances in such call center technologies, the breakdown of call center operating costs remains relatively constant, wherein personal expenses remain the largest cost center element, accounting for up to half of a call center's operating costs. Accordingly, most call center technologies have involved solutions that make the best use of human resources. A graphical depiction of a typical call center cost breakdown is shown in FIG. 1.

However, as can be seen in FIG. 1, the second largest operating cost comprises telecommunications expenses, such as line costs. These costs typically average between thirty and forty percent of a typical call center's operating costs. However, to date, this significant cost item has received little attention from a call center technology standpoint.

Since an outbound call campaign, by its very nature, involves significant telephone line costs, systems and methods are needed to eliminate unnecessary calls thereby cutting costs. In addition, by eliminating unnecessary calls, such systems and methods will have a corresponding reduction in labor costs associated with unnecessary calls.

The disclosed invention eliminates unnecessary telephone line costs and the possibility of alienating potential customers by providing a system and method of updating a call list on a predetermined, periodic basis while a call list is being processed.

SUMMARY OF THE INVENTION

In accordance with the present invention, a call list update processing system and method is provided. The call list update processing system is incorporated into a predictive dialing system, which includes a call list controller that is responsive to a source of call records for establishing and storing at least one call list. Each call record includes at least one telephone number to be called. The predictive dialing system also includes a predictive dialer, which is responsive to the call list controller, for dialing the telephone numbers included in each call record in the call list.

The call list update processing system is used to update a call list on a periodic basis. The call list update processing system includes a call list update processor, which itself includes at least a call list update file and a comparator. The call list update file is where call record update data, which is received periodically from the source of call records, is stored. The comparator compares the call record update data stored in the call list update file with call record data stored in the call records maintained by the call list controller. The call list update processor then updates the call list to reflect the call record update data.

In another embodiment of the invention, the call list update processor also includes a host update file in which call record update data received by a call center agent during a predictive dialer-initiated telephone call is stored. The call record update data stored in the host update file can be transmitted by the call list update processing system whenever communications are established with the host processor.

In the preferred embodiment, downloads and uploads of call record update data are performed when the predictive dialing system in inactive, such as during the nighttime hours.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
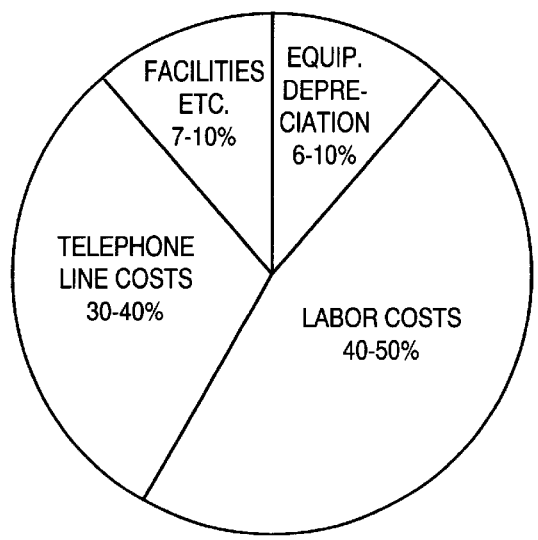
FIG. 1 is a pie chart showing a typical call center's operating cost breakdown.

Outbound call campaigns, such as telemarketing campaigns, generally begin with a download by the call center of a call list, from which a call center will initiate a call campaign. The most effective call list is a list consisting of qualified leads, who are persons or organizations who are likely to purchase a particular product or service. Qualified leads are generated using many techniques, which are well know in the telemarketing industry. Since a qualified lead is likely to purchase a product or service, a qualified lead is a preferred contact for a telemarketing campaign. However, a qualified lead may have already purchased the subject product or service of a telemarketing campaign before or shortly after the campaign is initiated but before the qualified lead is contacted during the campaign.

Accordingly, a telemarketing call initiated to a qualified lead who has already purchased the relevant product or service will result in an unnecessary telecommunications charge. Furthermore, such a call could also alienate the party called, which may thwart future telemarketing activities.

A typical telemarketing campaign would be initiated by a download, from a host computer having a campaign database, a call list. The call list, which would comprise names, telephone numbers and other information pertinent to potential purchasers of a product or service, would then be stored at the call center in an intelligent computer telephony system. As is well known in the art, a predictive dialer would be included in the computer telephony system, which would dial telephone numbers from the call list and automatically screen out "no answers", busy signals, and answering machines. The predictive dialer would therefore only present a call center agent with live voices.

A typical call list would be processed by an intelligent computer telephony system until it is exhausted, which could take many hours or days. Thus, as can be appreciated, during this time frame, there is a need to update the in-process call list on a routine basis in order to filter out contacts included in the list, which are no longer valid.

The disclosed system performs the in-process call list update function on a routine basis, which is preferably performed daily during the nighttime hours, when the computer telephony system is not being used to initiate outbound calls. The call list update system initiates a scheduled communication with a host database and searches the host database to retrieve database updates made since the preceding call list update function. The call list update system would then download, from the host database, those database elements for which updates have been entered. The call list update system would then store the downloaded call list update file in a storage buffer in the computer telephony system.

The system would then search the call list resident in the computer telephony system and identify those records for which updates have been downloaded.

For example, one type of update could indicate that a party in the call list has purchased the relevant product or service and would require the removal of that record from the list. In another example, a party on the list may have indicated, in response to a separate telemarketing call campaign, that the party does not wish to be called again. Another example of a call list update could be to provide a forwarding telephone number for a specific party.

Since call lists are stored in a database format, in one embodiment, only those data fields for which updates have been downloaded need be searched. Thus, the system will not require a search of each and every record in the database. Accordingly, the update function can be performed in a relatively short time period. In the presently implemented embodiment, all records in the database will be searched to identify those records for which updates have been downloaded.

Figure 2:
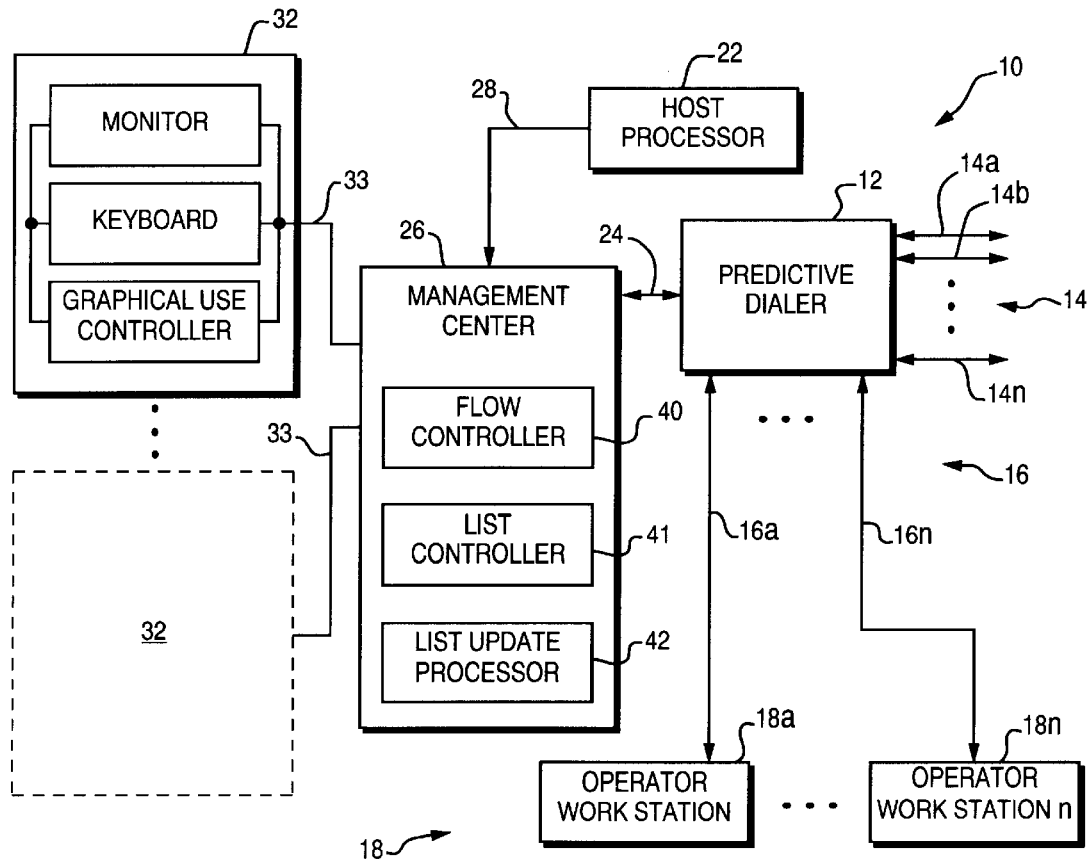
FIG. 2 is a block diagram of a predictive dialing system, including a call list update processor according to the present invention.

Referring now to FIG. 2, a predictive dialing system 10 includes a predictive dialer 12 having a plurality of telephone lines 14a through 14n coupled thereto. The predictive dialer 12 may be provided, for example, as the CAS 2000 and CAS 500 models manufactured by Davox Corporation of Westford, Mass.

A plurality of operator workstations 18a through 18n, generally denoted 18, are coupled to the predictive dialer 12 through a corresponding one of the communication lines 16a through 16n generally denoted 16. Communication lines 16 may be of the type adapted for transmission of both voice and data signals. The operation of the predictive dialer 12 and operator workstations 18 are more fully described in commonly owned U.S. Pat. No. 5,164,981, which is incorporated herein by reference.

The host processor 22 transfers call record files, also called call lists, to a management center 26 via the datapath 28. The management center 26 is coupled to the predictive dialer 12 through a bus 24. The management center 26 has coupled thereto at least one supervisor workstation 32. Those of skill in the art however will recognize that a plurality of such workstations 32 may be coupled to the management center 26. The supervisor workstations 32 typically includes a display 34, a keyboard 36 and a graphical user interface (GUI) 38, which may include, for example, a mouse and user intuitive icons displayed on the workstation display monitor 34, or other selector devices such as a keyboard. The supervisor workstation 32 is coupled to the management center 26 through a conventional interface (not shown) and communication line 33 such that management center 26 may transmit data to and receive data from the workstation 32.

The management center 26 further includes at least a flow controller 40, a call list controller 41, the operation of which are more fully described in commonly owned U.S. Pat. No. 5,343,518, which is incorporated herein by reference. Management center 26 also includes at least one call list update processor 42. Flow controller 40 and call list controller 41 cooperate with other portions of the management center to provide the predictive dialer 12 with at least one pre-ordered list of call records to be dialed. Those skilled in the art will recognize, of course, that although flow controller 40 and list controller 41 are provided here as a portion of the management center 26, flow controller 40 and/or list controller 41 may alternatively be provided as a portion of the predictive dialer 12 for the host processor 22. Thus, the flow and list controllers 40 and 41 may be disposed in the most convenient, cost effective or otherwise desirable location and coupled to other portions of the system as required to provide an operative system.

Figures 3, 4:
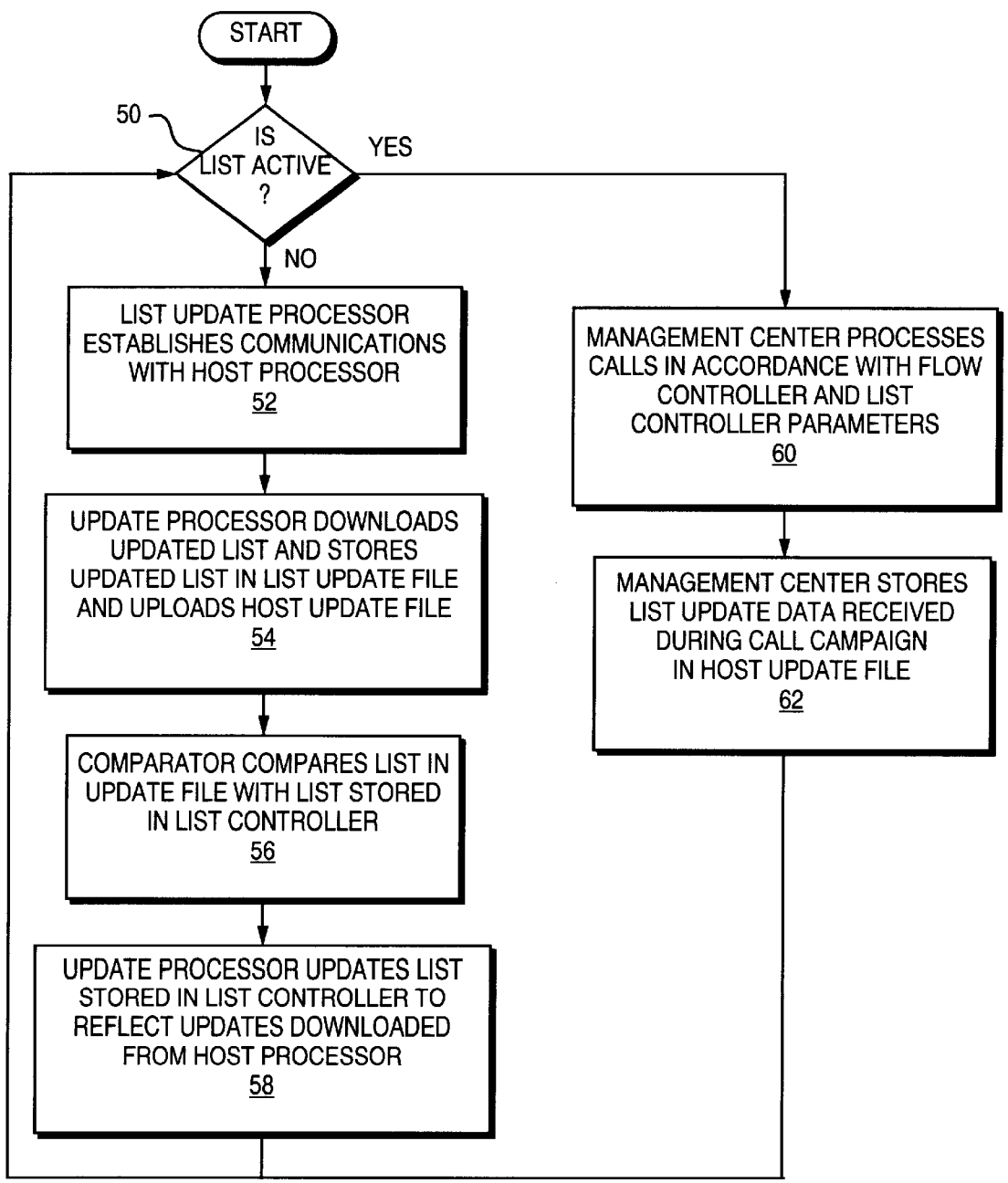
FIG. 3 is a block diagram of the call list update processor of FIG. 2, showing the components thereof.
FIG. 4 is a flow diagram of the call list update processing function performed the predictive dialing system of FIG. 2.

FIG. 3 shows the components of the call list update processor 42. Call list update processor 42 includes a host update file 44, in which call list update data that is received from a contacted party during a call campaign is stored, a call list update file 46, in which call list update data received from a source of call records, such as host processor 22 of FIG. 2, is stored, and a comparator 48. Comparator 48 is used to compare the call list update data stored in call list update file 46 with the call records included in the call list of interest, which are stored in the management center's list controller, 41 of FIG. 2.

In operation, an operator (not shown) typically attends a corresponding one of the operator workstations 18a through 18n. The predictive dialer 12 dials a telephone number from one of the call records in a list of such call records assigned to a particular one of the operators. If the call requires the service of the particular operator, the predictive dialer 12 transfers the call to the corresponding one of the operator workstations 18a through 18n and the operator may service the call.

Referring now to FIG. 4, a flow chart of the processing steps performed by the management center in order to update a call list are shown. As indicated earlier, in conjunction with FIG. 2, the management center 26 is provided for managing, among other tasks, one or more call lists and for monitoring the call processes of the operator workstations 18.

The call list update process begins with step 50, wherein the management center determines whether or not a call list is active. In the preferred embodiment of the invention, the update process would occur during times of call list inactivity, such as during the nighttime hours. However, the principles of the invention are equally applicable to a dynamic update process, which would update a call list in "real time" for call centers in which continuous communications are established between the call center management center and the host processor.

If a call list is active, then the management center processes calls in accordance with existing flow controller and list controller parameters, step 60. Furthermore, the management center stores list update data received during a call campaign in a host update file, step 62. One example of data received during a call, which would be especially beneficial for a host update would be an indication by a called party to "never call me again" or "remove me from your database" indications. The host update file would be dynamically updated during a call campaign and will be available for upload to a host processor which will be discussed further below.

If the call list of interest is inactive, such as during nighttime hours, the list update processor would establish communications with the host processor, step 52. Once communications are established, the update processor would download an updated call list and store such updated call list in a call list update file. Simultaneously, the update processor would upload any data stored in the host update file, which would be important data received during a call campaign, step 54.

A comparator would then compare the call list of interest, which is stored in the list update file with the inactive call list of interest, which is stored in list controller 41, step 56. Since the information stored in a call list is typically stored in a database format, the comparator would search only those database fields in which updated information has been received. Therefore, the update process could be performed in a shorter time period than would be required if the comparator merely sequentially compared the call list of interest with the updated list stored in the list update file. The update processor would then update the list stored in the list controller to reflect the call list updates downloaded from the host processor, step 58.

Modifications and substitutions by one of ordinary skill in the art are considered to be within the scope of the present invention which is not to be limited except by the claims which follow.

What is claimed is:

1. A call list update processing system comprising:
    a call list controller, responsive to a source of call records, each call record including at least one telephone number to be called, for establishing and storing at least one call list, each call list including at least one call record;
    a predictive dialer, responsive to said call list controller, for dialing at least one telephone number included in each call record of said at least one call list; and
    a call list update processing system for updating said at least one call list, said call list update processing system comprising:
        a call list update processor, said processor including a call list update file for storing call record update data received from said source of call records, said call record update data including an updated call record that corresponds to a call record in the call list, and
        a comparator for comparing data stored in said updated call record with said corresponding call record and for updating said corresponding call record to reflect the received call record update data
    wherein said source of call records includes a host processor; and
    wherein said call list update processor further comprises a host update file, for storing call records update data received by an agent during a telephone call with a third party until said call record update data is transmitted to said host processor by said call list update processor.

2. The call list update processing system as claimed in claim 1, wherein said call list update processor operates when said predictive dialer is inactive.

3. The call list update processing system as claimed in claim 1, wherein said telephone call is initiated by said predictive dialing system and said third party is a subject of a call record.

4. The call list update processing system as claimed in claim 1, wherein said call record update data stored in said host update file is used by said call list update processor to update said at least one call list stored by said call list controller.

5. A predictive dialing system comprising:
    a call list controller, responsive to a source of call records, each call record including at least one telephone number to be called, for establishing and storing at least one call list, each said call list including at least one call record;
    a flow controller, for controlling the flow of call records to a predictive dialer and for controlling the flow of multiple call lists with respect to each other; and
    a call list update processing system, for communicating with said source of call records, for downloading call record update data from said source of call records, said call record update data including an updated call record that corresponds to a call record in the call list, for comparing said updated call record with said corresponding call record stored in said at least one call list and for updating said corresponding call records with said call record update data
    wherein said call list update processing system comprises a call list update processor including a call list update file, for storing said downloaded call record update data; and a
    comparator, for comparing said downloaded call record update data with said call records stored by said call list controller
    wherein said source of call records is a host processor; and
    wherein said call list update processor further includes a host update file, for storing call record update data received by an agent during a telephone call initiated by said predictive dialing system until communications are established between said predictive dialing system and said host processor and said call record update data is transmitted to said host processor.

* * * * *